United States Patent
Horie et al.

(10) Patent No.: US 10,030,283 B2
(45) Date of Patent: Jul. 24, 2018

(54) METHOD FOR PRODUCING SURFACE-TREATED STEEL SHEET FOR BATTERY CONTAINERS

(71) Applicant: TOYO KOHAN CO., LTD., Tokyo (JP)

(72) Inventors: Shinichirou Horie, Yamaguchi (JP); Koh Yoshioka, Yamaguchi (JP); Kazuhiko Ishihara, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 238 days.

(21) Appl. No.: 14/908,473

(22) PCT Filed: Apr. 18, 2014

(86) PCT No.: PCT/JP2014/061021
§ 371 (c)(1),
(2) Date: Jan. 28, 2016

(87) PCT Pub. No.: WO2015/015847
PCT Pub. Date: Feb. 5, 2015

(65) Prior Publication Data
US 2016/0168657 A1    Jun. 16, 2016

(30) Foreign Application Priority Data

Jul. 31, 2013   (JP) .................. 2013-158574

(51) Int. Cl.
*C22C 38/08*   (2006.01)
*C22C 19/03*   (2006.01)
(Continued)

(52) U.S. Cl.
CPC .............. *C21D 9/46* (2013.01); *B32B 15/011* (2013.01); *B32B 15/015* (2013.01); *C21D 1/26* (2013.01);
(Continued)

(58) Field of Classification Search
None
See application file for complete search history.

(56) References Cited

FOREIGN PATENT DOCUMENTS

| | | |
|---|---|---|
| CN | 1082988 A | 3/1994 |
| CN | 101922031 A | 12/2010 |

(Continued)

OTHER PUBLICATIONS

Machine-English translation of Japanese patent 2007-335205 A, Sugihara Reiko et al. Dec. 27, 2007.*

(Continued)

*Primary Examiner* — Deborah Yee
(74) *Attorney, Agent, or Firm* — Muncy, Geissler, Olds & Lowe, P.C.

(57) ABSTRACT

Provided is a method for producing a surface-treated steel sheet for battery containers including: a first process of forming an iron-nickel alloy plating layer on at least one side of a steel sheet; a second process of forming a nickel plating layer on the iron-nickel alloy plating layer; and a third process of performing a thermal treatment after forming the nickel plating layer to form an iron-nickel alloy layer having an outermost surface, at which a content ratio of Fe atoms is 12 to 55% by atom, on an outermost layer by thermal diffusion. The invention makes it possible to provide the method for producing the surface-treated steel sheet for battery containers that can suppress the elution of iron inside the battery when being used for a battery container, whereby the service life of the battery can be extended and battery characteristics such as discharge characteristics can be improved.

3 Claims, 10 Drawing Sheets

(51) Int. Cl.
*C21D 9/00* (2006.01)
*C21D 6/00* (2006.01)
*H01M 2/16* (2006.01)
*C22F 1/10* (2006.01)
*C25D 3/12* (2006.01)
*C25D 3/20* (2006.01)
*B32B 15/01* (2006.01)
*C23C 10/02* (2006.01)
*C23C 10/28* (2006.01)
*C21D 9/46* (2006.01)
*C22C 38/00* (2006.01)
*H01M 2/02* (2006.01)
*C21D 1/26* (2006.01)
*C22C 38/02* (2006.01)
*C22C 38/04* (2006.01)
*C22C 38/06* (2006.01)
*C25D 3/56* (2006.01)
*C25D 5/36* (2006.01)
*C25D 5/50* (2006.01)
*H01M 6/04* (2006.01)

(52) U.S. Cl.
CPC .............. *C21D 6/005* (2013.01); *C21D 6/008* (2013.01); *C22C 38/00* (2013.01); *C22C 38/002* (2013.01); *C22C 38/02* (2013.01); *C22C 38/04* (2013.01); *C22C 38/06* (2013.01); *C22F 1/10* (2013.01); *C23C 10/02* (2013.01); *C23C 10/28* (2013.01); *C25D 3/12* (2013.01); *C25D 3/562* (2013.01); *C25D 5/36* (2013.01); *C25D 5/50* (2013.01); *H01M 2/0285* (2013.01); *H01M 2/0287* (2013.01); *H01M 6/04* (2013.01); *H01M 2220/10* (2013.01); *H01M 2220/30* (2013.01)

(56) References Cited

FOREIGN PATENT DOCUMENTS

| | | |
|---|---|---|
| JP | 06-002104 | 1/1994 |
| JP | 2000-123797 | 4/2000 |
| JP | 2002-208382 | 7/2002 |
| JP | 2002-298793 | 10/2002 |
| JP | 2007-335205 | 12/2007 |
| JP | 2008-041527 | 2/2008 |
| WO | WO 2010/143374 A1 | 12/2010 |

OTHER PUBLICATIONS

An Office Action from corresponding Chinese Application No. 201480043047.4 dated Sep. 18, 2017; 9 pgs. w/Translation.

* cited by examiner

EXAMPLE 2

COMPARATIVE
EXAMPLE 1

COMPARATIVE EXAMPLE 6

COMPARATIVE
EXAMPLE 8

METHOD FOR PRODUCING SURFACE-TREATED STEEL SHEET FOR BATTERY CONTAINERS

TECHNICAL FIELD

The present invention relates to a method for producing a surface-treated steel sheet for battery containers.

BACKGROUND ART

In recent years, alkaline batteries which are primary batteries and nickel hydrogen batteries and lithium-ion batteries which are secondary batteries are widely used as an operating power source for use in portable devices such as audio devices and mobile phones, which are used in various fields. These batteries are required to have a long service life, enhanced performance, or the like in accordance with the enhanced performance of the devices in which the batteries are equipped. A battery container, which is filled with electric power generating elements such as positive electrode active materials and negative electrode active materials, is also required to be improved in their performance as an important constitutional element of batteries.

An example of such a battery container is disclosed in Patent Document 1 in which after a nickel plating layer is formed on a steel sheet, an iron-nickel alloy plating layer is formed to be an inner surface of the battery container.

PRIOR ART DOCUMENT

Patent Document

[Patent Document 1] JP 2000-123797 A

SUMMARY OF INVENTION

Problems to be Solved by Invention

In a battery container disclosed in Patent Document 1, however, there is a problem that the elution of iron could be effectively suppressed inside of a battery when the content ratio of Fe atoms is too high with respect to an iron-nickel alloy plating layer formed on a steel sheet. In addition, when the content ratio of Fe atoms is too low with respect to the iron-nickel alloy plating layer, since the content ratio of nickel having difference in standard electrode potential with iron contained in the steel sheet becomes higher, deep cracks occurs inside the battery container at the time of forming into the battery container and thus the steel sheet is exposed. Accordingly, there is a problem that the iron is easily eluted from the steel sheet due to such difference in standard electrode potential.

An object of the invention is to provide a method for producing a surface-treated steel sheet for battery containers that can suppress the elution of iron inside the battery when being used for a battery container, whereby the service life of the battery can be extended and battery characteristics such as discharge characteristics can be improved.

Means for Solving Problems

As a result of intensive studies to achieve the above objects, the present inventors have found that the above objects can be achieved by forming an iron-nickel alloy layer on an outermost layer by a thermal treatment after an iron-nickel alloy plating layer and a nickel plating layer are formed on at least one side of a steel sheet, the iron-nickel alloy layer having an outermost surface at which the content ratio of Fe atoms is 12 to 55% by atom, and accomplished the invention.

That is, according to the invention, there is provided a method for producing a surface-treated steel sheet for battery containers including: a first process of forming an iron-nickel alloy plating layer on at least one side of a steel sheet; a second process of forming a nickel plating layer on the iron-nickel alloy plating layer; and a third process of performing a thermal treatment after forming the nickel plating layer to form an iron-nickel alloy layer having an outermost surface, at which the content ratio of Fe atoms is 12 to 55% by atom, on an outermost layer by thermal diffusion.

In the producing method of the invention, it is preferred that when the iron-nickel alloy plating layer is formed in the first process, the iron-nickel alloy plating layer is formed to have a content ratio of Fe atoms being 15 to 65% by atom.

In the producing method of the invention, it is preferred that when the nickel plating layer is formed in the second process, the nickel plating layer is formed to have a thickness of 0.1 to 0.5 µm.

Effect of Invention

According to the invention, it is possible to provide a method for producing a surface-treated steel sheet for battery containers that can suppress the elution of iron inside the battery when being used for a battery container, whereby the service life of the battery can be extended and battery characteristics such as discharge characteristics can be improved.

MODE(S) FOR CARRYING OUT THE INVENTION

Embodiments of the invention will be described below with reference to the accompanying drawings.

First Embodiment

Figure 1:
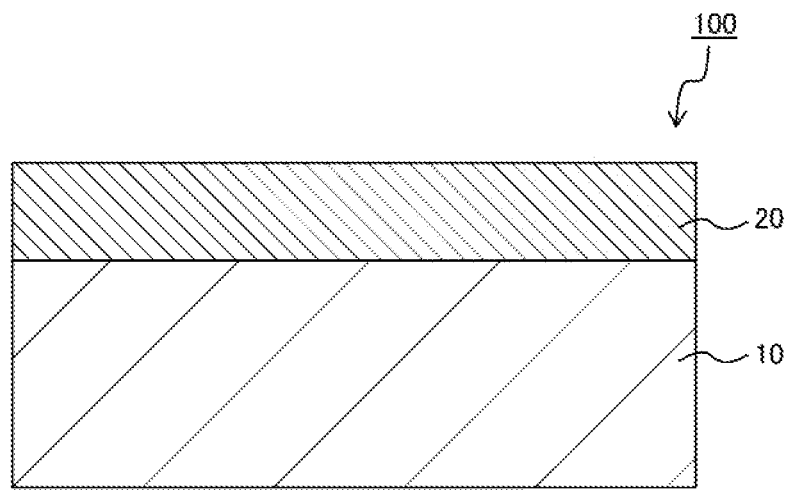
FIG. 1 is a configuration diagram of a surface-treated steel sheet for battery containers according to a first embodiment.

FIG. 1 is a diagram illustrating a configuration of a surface-treated steel sheet for battery containers 100 produced by a producing method according to this embodiment. In this embodiment, nickel plating is performed after iron-nickel alloy plating is performed on at least one side of a steel sheet 10, and then a thermal treatment such as continuous annealing or batch-type annealing is performed, whereby the surface-treated steel sheet for battery containers 100 is formed in which an iron-nickel alloy layer 20 is formed on the steel sheet 10, as illustrated in FIG. 1.

<Steel Sheet 10>

The steel sheet 10 to be a base sheet for the surface-treated steel sheet for battery containers 100 according to this embodiment is not particularly limited as long as it has excellent workability in drawing process, in drawing and ironing process, and in drawing-thin-redrawing (DTR) process. For example, steel sheets may be used, such as formed of low-carbon aluminum-killed steel (carbon amount of 0.01 to 0.15 wt %), extra-low-carbon steel having carbon amount of 0.003 wt % or less, or non-aging extra-low-carbon steel obtained by adding Ti or Nb to extra-low-carbon steel.

In this embodiment, a hot-rolled plate of the above steel is washed using acid to remove scale (oxide film) on the surface, and thereafter cold-rolled, followed by electrolytic cleaning of rolling oil, thereby to be used as the base sheet. Alternatively, one that is obtained by performing annealing and temper rolling after the above electrolytic cleaning is used as the base sheet. The annealing in this case may be any of continuous annealing and batch-type annealing, but is not particularly limited thereto.

<Iron-Nickel Alloy Layer 20>

As illustrated in FIG. 1, the iron-nickel alloy layer 20 is the outermost layer of the surface-treated steel sheet for battery containers 100. The iron-nickel alloy layer 20 is formed in such a manner that after iron-nickel alloy plating is performed on the steel sheet 10, nickel plating is performed, and then a thermal treatment such as continuous annealing or batch-type annealing is further performed on the plated steel sheet 10.

Figure 2:
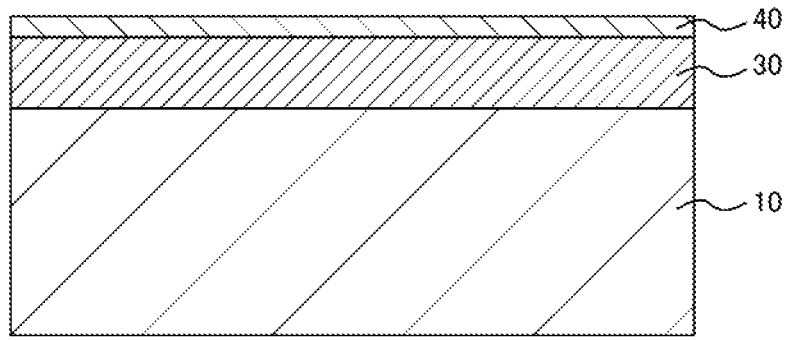
FIG. 2 is a diagram for describing a method for producing the surface-treated steel sheet for battery containers according to the first embodiment.

Specifically, as illustrated in FIG. 2, first, iron-nickel alloy plating is performed on the steel sheet 10 to form an iron-nickel alloy plating layer 30, and then nickel plating is performed on the formed iron-nickel alloy plating layer 30 to form a nickel plating layer 40, thereby obtaining a surface-treated steel sheet. Subsequently, a thermal treatment is performed on a surface-treated steel sheet illustrated in FIG. 2 so that each layer is thermally diffused, and thus iron is diffused up to the outermost surface. Thus, the iron-nickel alloy layer 20 is formed and the surface-treated steel sheet for battery containers 100 illustrated in FIG. 1 can be obtained.

Then, in this embodiment, the iron-nickel alloy layer 20 formed in this way has the content ratio of Fe atoms which is controlled to be within the range of 12 to 55% by atom at the outermost surface.

In this embodiment, when the content ratio of Fe atoms is controlled to be within the above range at the outermost surface of the formed iron-nickel alloy layer 20, the elution of iron into an electrolyte can be suppressed by the action of nickel existing on the surface of the iron-nickel alloy layer 20 when the resulting surface-treated steel sheet for battery containers 100 is used for a battery container. In this embodiment, therefore, when the surface-treated steel sheet for battery containers 100 is used for a battery container, the elution of iron into the electrolyte can be suppressed, so that it is possible to prevent breakage of the battery container caused by a gas resulting from the elution of iron. Furthermore, it is also possible to achieve a long service life of the battery by improving the liquid leakage resistance of the battery container.

Furthermore, in this embodiment, when the content ratio of Fe atoms is controlled to be within the above range at the outermost surface of the iron-nickel alloy layer 20, the iron-nickel alloy layer 20 has an appropriate degree of surface hardness. Thus, when the resulting surface-treated steel sheet for battery containers 100 is formed for the battery container by a working process such as drawing, ironing, or DI or DTR forming such that the iron-nickel alloy layer 20 becomes the inside of the battery container, cracks of fine and shallow depth can occur on the surface of the iron-nickel alloy layer 20. Then, a contact area of the iron-nickel alloy layer 20 with a positive electrode mixture used for the battery can be increased by these cracks of fine and shallow depth, whereby internal resistance of the battery is lowered and battery characteristics such as discharge characteristics can be improved.

When the content ratio of Fe atoms is too low at the outermost surface of the iron-nickel alloy layer 20, the hardness of the iron-nickel alloy layer 20 becomes too small, and cracks do not suitably occur on an inner surface of the battery container during a forming process into the battery container. For this reason, it is not possible to sufficiently obtain an effect of lowering internal resistance of the battery and improving battery characteristics. Alternatively, when the content ratio of Fe atoms is too high at the outermost surface of the iron-nickel alloy layer 20, the content ratio of nickel is reduced at the outermost surface of the iron-nickel alloy layer 20, and thus corrosion resistance is lowered. Accordingly, in this case, the iron is easily eluted into an electrolyte when the resulting surface-treated steel sheet for battery containers 100 is used for the battery container.

In this embodiment, the content ratio of Fe atoms is 12 to 55% by atom, preferably 12 to 53% by atom, and more preferably 15 to 50% by atom at the outermost surface of the iron-nickel alloy layer 20. When the content ratio of Fe atoms is controlled to be within the above range at the outermost surface of the nickel alloy layer 20, liquid leakage resistance and battery characteristics can be improved when the resulting surface-treated steel sheet for battery containers 100 is used for the battery container as described above. As a method for measuring the content ratio of Fe atoms at the outermost surface of the iron-nickel alloy layer 20, for example, it is possible to use a method for measuring the surface of the iron-nickel alloy layer 20 using a scanning-type Auger electron spectroscopic analyzer.

In this embodiment, furthermore, the surface hardness of the iron-nickel alloy layer 20 is preferably 210 to 250 in terms of Vickers hardness (HV). When the surface hardness of the iron-nickel alloy layer 20 is too high in terms of Vickers hardness, deep cracks occur in the iron-nickel alloy layer 20 during a forming process into the battery container, and thus the steel sheet 10 is exposed. For this reason, when the iron-nickel alloy layer 20 is used for the battery container, the iron is eluted from the exposed portion of the steel sheet 10, and liquid leakage resistance of the battery container is deteriorated. Meanwhile, when the surface hardness of the iron-nickel alloy layer 20 is too low in terms of Vickers hardness, cracks do not suitably occur on an inner surface of the battery container during a forming process into the battery container. For this reason, it is not possible to sufficiently obtain an effect of lowering internal resistance of the battery and improving battery characteristics.

The thickness of the iron-nickel alloy layer 20 is not particularly limited, but is preferably 0.6 to 3.0 μm. When the thickness of the iron-nickel alloy layer 20 is set to be within the above range, liquid leakage resistance and battery characteristics of the battery container are further improved in a case where the resulting surface-treated steel sheet for battery containers 100 is used for the battery container.

The thickness of the iron-nickel alloy layer 20 can be measured using the following method, for example. That is the transition of Ni intensity may be measured using a high-frequency glow discharge optical emission spectrometer in a depth direction of the iron-nickel alloy layer 20 with respect to the surface-treated steel sheet for battery containers 100 to detect a depth at which no nickel exists, from the start of measurement, and the thickness of the iron-nickel alloy layer 20 can thus be determined.

In this embodiment, when the Ni intensity is measured for the surface-treated steel sheet for battery containers 100, a nickel existing region is defined by a region in which the Ni intensity is $1/10$ or more of the maximum value thereof on the basis of the maximum value of the Ni intensity. Accordingly, in this embodiment, while the Ni intensity is measured in the depth direction of the surface-treated steel sheet for battery containers 100, the measurement time may be calculated from the starting time of measurement to a time at which the Ni intensity becomes less than $1/10$ of the maximum value of the Ni intensity. The thickness of the iron-nickel alloy layer 20 can be determined on the basis of the calculated measurement time.

Figure 3:
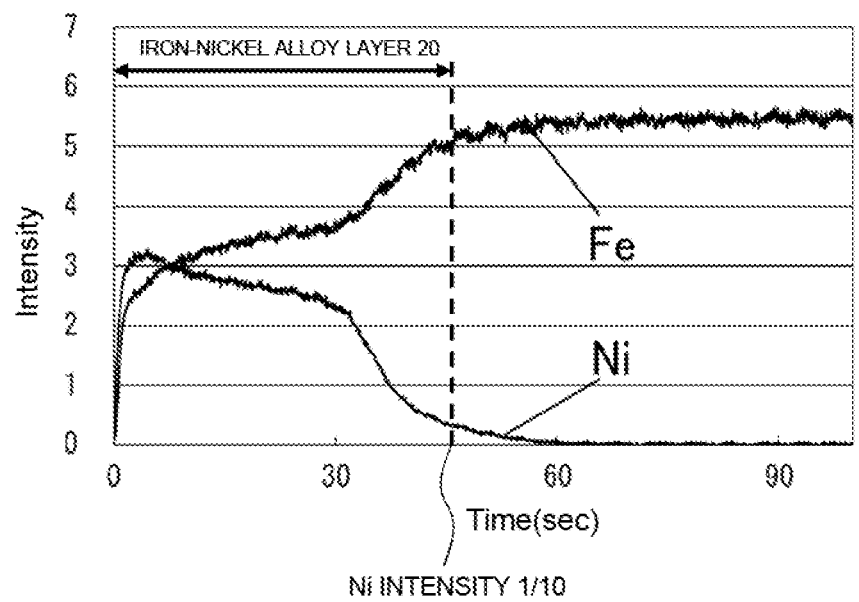
FIG. 3 is a diagram illustrating results obtained by measuring Ni intensity and Fe intensity with respect to the surface-treated steel sheet for battery containers according to the first embodiment, using a high-frequency glow discharge optical emission spectrometer.

Here, FIG. 3 is a graph illustrating results obtained by measuring the transition of Ni intensity and Fe intensity in the depth direction of the iron-nickel alloy layer 20 with respect to the surface-treated steel sheet for battery containers 100 using a high-frequency glow discharge optical emission spectrometer. In FIG. 3, a horizontal axis represents a measurement time by the high-frequency glow discharge optical emission spectrometer, and a vertical axis represents the Ni intensity or the Fe intensity which is measured. For example, in the graph illustrated in FIG. 3, the Ni intensity has the maximum value at a time of about 3 seconds, and a time of about 46 seconds from the starting time of measurement can be calculated as a time at which the Ni intensity becomes less than $1/10$ of the maximum value (in FIG. 3, a time indicated by "Ni intensity $1/10$"). Based on the measurement time for about 46 seconds calculated in this way, the thickness of the iron-nickel alloy layer 20 can be determined.

<Method for Producing the Surface-Treated Steel Sheet for Battery Containers 100>

Next, the description is made on a method for producing the surface-treated steel sheet for battery containers 100 according to this embodiment.

As illustrated in FIG. 2, the surface-treated steel sheet for battery containers 100 according to this embodiment is produced in such a manner that after the iron-nickel alloy plating layer 30 and the nickel plating layer 40 are formed on the steel sheet 10 in this order, a thermal treatment is performed such that each layer is thermally diffused to diffuse iron up to the outermost surface, and thus the iron-nickel alloy layer 20 is formed as an outermost layer.

Specifically, first, a steel sheet is prepared to constitute the steel sheet 10, and iron-nickel alloy plating is performed on the steel sheet 10, whereby the iron-nickel alloy plating layer 30 is formed on the steel sheet 10. The iron-nickel alloy plating can be performed by, for example, an electroplating method or an electroless plating method. However, the iron-nickel alloy plating is preferably performed by the electroplating method in view of easily controlling the content ratio of Fe atoms at the outermost surface of the resulting iron-nickel alloy layer 20.

For example, in the case of performing the iron-nickel alloy plating by the electroplating method, the plating is performed on the steel sheet 10 using a plating bath (iron-nickel plating bath) contained with a buffer agent and the like in addition to an iron salt and a nickel salt that constitute the iron-nickel alloy layer 20. A specific example of the iron-nickel includes a watt bath or a sulfamate salt as a base and may include a plating bath added with an iron salt such as iron sulfate, a nickel salt such as nickel sulfate or nickel chloride, and a buffer agent such as boric acid or citric acid.

The iron salt and the nickel salt to be contained in the iron-nickel plating bath are not particularly limited. An example of the iron salt preferably includes iron sulfate, iron chloride, iron sulfamate, or ferric citrate, and an example of the nickel salt preferably includes nickel sulfate, nickel chloride, nickel carbonate, nickel acetate, nickel sulfamate, or nickel methansulfonate.

In this embodiment, with respect to the iron-nickel alloy plating layer 30 formed by the iron-nickel alloy plating, the content ratio of Fe atoms and Ni atoms is not particularly limited. However, the content ratio of Fe atoms is preferably 15 to 65% by atom, and more preferably 20 to 60% by atom. In addition, the content ratio of Ni atoms is preferably 35 to 85% by atom, and more preferably 40 to 80% by atom. When the content ratio of Fe atoms and Ni atoms is within the above range, it is possible to control the content ratio of Fe atoms at the outermost surface of the resulting iron-nickel alloy layer 20 to be within the range described above. The content ratio of these Fe atoms and Ni atoms can be controlled by appropriate adjustment of the composition of the iron-nickel plating bath.

In addition, the thickness of the iron-nickel alloy plating layer 30 formed by the iron-nickel alloy plating is not particularly limited, but is preferably 0.5 to 1.5 µm and more preferably 0.5 to 1.0 µm. When the thickness of the iron-nickel alloy plating layer 30 is set to be within the above range, it is possible to thermally diffuse the iron-nickel alloy plating layer 30 in excellent when the thermal treatment is performed after the nickel plating layer 40 is formed on the iron-nickel alloy plating layer 30 and to control the content ratio of Fe atoms at the outermost surface of the resulting iron-nickel alloy layer 20 to be within the range described above.

In addition, pH of the iron-nickel plating bath is preferably 1.0 to 3.0, and more preferably 1.5 to 2.9. When the pH of the iron-nickel plating bath is within the above range, it is possible to prevent occurrence of ferrous sludge (sediment) in the iron-nickel plating bath. Thus, the sludge can be prevented from being adhered onto the steel sheet 10, and the concentration of iron ions in the iron-nickel plating bath can be appropriately further managed, so that the iron-nickel alloy plating can be performed in excellent fashion.

Moreover, a temperature of the iron-nickel plating bath is preferably 40 to 80° C., and more preferably 50 to 70° C. Furthermore, when the electroplating is performed by the iron-nickel plating bath, current density is preferably 5 to 40 A/dm$^2$, and more preferably 5 to 30 A/dm$^2$. When the temperature of the iron-nickel plating bath and the current density are within the above range at the time of performing the electroplating, it is possible to perform the iron-nickel alloy plating in excellent fashion.

Subsequently, in this embodiment, nickel plating is performed on the iron-nickel alloy plating layer 30 formed by the iron-nickel alloy plating such that the nickel plating layer 40 is formed on the iron-nickel alloy plating layer 30, and thus the surface-treated steel sheet is obtained as illustrated in FIG. 2. The nickel plating layer 40 can be formed using a known nickel plating method such as a watt bath or a sulfamate bath.

Here, the thickness of the nickel plating layer 40 formed by the nickel plating is not particularly limited, but is preferably 0.1 to 0.5 µm. When the thickness of the nickel plating layer 40 is set to be within the above range, the thermal diffusion of the nickel plating layer 40 sufficiently proceeds with the iron-nickel alloy plating layer 30 or the steel sheet 10 when the thermal treatment is performed after the nickel plating layer 40 is formed, and the content ratio of Fe atoms can be controlled to be within above range at the outermost surface of the resulting iron-nickel alloy layer 20. In addition, when the thickness of the nickel plating layer 40 is set to be within the above range, since the thermal diffusion of the nickel plating layer 40 can sufficiently proceed by the thermal treatment under a lower thermal treatment temperature or a shorter thermal treatment time, it is possible to prevent deterioration of the steel sheet 10 due to heat.

In this embodiment, subsequently, the thermal treatment is performed on the resulting surface-treated steel sheet after the nickel plating layer 40 is formed. In this case, each layer constituting the surface-treated steel sheet is thermally diffused by the thermal treatment such that iron is diffused up to the outermost surface. Thus, the iron-nickel alloy layer 20 is formed at the outermost layer as illustrated in FIG. 1.

A thermal treatment method is not particularly limited, but, for example, a continuous annealing method or a batch-type annealing method may be used. In the case of performing the thermal treatment by the continuous annealing method, it is preferable that a thermal treatment temperature is 700 to 800° C. and a thermal treatment time is 10 seconds to 300 seconds. Furthermore, in the case of performing the thermal treatment by the batch-type annealing method, it is preferable that a thermal treatment temperature is 450 to 650° C., a thermal treatment time is 1 hour to 10 hours, and a thermal treatment atmosphere is a non-oxidizing atmosphere or a reducing protection gas atmosphere. When the thermal treatment atmosphere is the reducing protection gas atmosphere, a protection gas may preferably be used which consists of 75% hydrogen-25% nitrogen with high heat transfer and which is generated by an ammonia crack method referred to as hydrogen enriched annealing.

In this embodiment, the content ratio of Fe atoms is preferably 12 to 55% by atom, more preferably 12 to 53% by atom, and further more preferably 15 to 50% by atom at the outermost surface of the iron-nickel alloy layer 20 formed by the thermal treatment. When the content ratio of Fe atoms is within the above range, it is possible to improve liquid leakage resistance and battery characteristics when the resulting surface-treated steel sheet for battery containers 100 is used for the battery container. Here, as a method of controlling the content ratio of Fe atoms at the outermost surface of the iron-nickel alloy layer 20 to be within the above range, for example, there is a method for adjusting the content ratio of iron salt and nickel salt contained in the iron-nickel plating bath described above or a method for adjusting the thickness of the iron-nickel alloy plating layer 30 and the nickel plating layer 40.

As described above, the surface-treated steel sheet for battery containers 100 according to this embodiment is produced.

According to this embodiment, as described above, the thermal treatment is performed after the iron-nickel alloy plating layer 30 and the nickel plating layer 40 are formed on the steel sheet 10 in the order, and the iron-nickel alloy layer 20 is formed on the outermost layer such that the content ratio of Fe atoms is within the above range at the outermost surface thereof, whereby the surface-treated steel sheet for battery containers 100 is obtained. When the obtained the surface-treated steel sheet for battery containers 100 is used for the battery container, it is possible to improve liquid leakage resistance and battery characteristics.

In the surface-treated steel sheet for battery containers 100 of this embodiment, the content ratio of Fe atoms is lowest at the outermost surface of the iron-nickel alloy layer 20, and becomes gradually higher toward the steel sheet 10 from the outermost surface. This is due to the fact that the content ratio of Fe atoms becomes lower as being closer to the outermost surface of the iron-nickel alloy layer 20 to be formed, because the amount of iron to be thermally diffused becomes lower toward the outermost surface of the nickel plating layer 40 when the iron contained in the iron-nickel alloy plating layer 30 and the steel sheet 10 of the surface-treated steel sheet as illustrated in FIG. 2 is thermally diffused into the nickel plating layer 40 by the above-described thermal treatment.

For this reason, as described above, the content ratio of Fe atoms is controlled to become gradually higher toward steel sheet 10 from the outermost surface in the surface-treated steel sheet for battery containers 100 of this embodiment. As a result, the ratio of Ni atoms contained in the iron-nickel alloy layer 20 becomes highest in the vicinity of the outermost surface and becomes gradually lower toward the steel sheet 10 from the outermost surface at the same time. Thus, the following effects can be achieved.

That is, first, since the ratio of Ni atoms becomes highest in the vicinity of the outermost surface of the iron-nickel alloy layer 20, when the surface-treated steel sheet for battery containers 100 of this embodiment is used for the battery container, it is possible to effectively suppress the elution of iron from the outermost surface. Furthermore, in this case, the content ratio of Fe atoms becomes higher in the inside of the iron-nickel alloy layer 20 while the elution of iron is effectively suppressed from the outermost surface. Thus, the overall iron-nickel alloy layer 20 can have an appropriate degree of surface hardness. Therefore, cracks of fine and shallow depth can occur on the surface when the surface-treated steel sheet for battery containers 100 is formed into the battery container, and battery characteristics such as discharge characteristics can be improved as described above.

In addition, the surface-treated steel sheet for battery containers 100 of this embodiment is configured such that the ratio of Ni atoms contained in the iron-nickel alloy layer 20 becomes gradually lower toward the steel sheet 10 from the outermost surface. Thus, when the surface-treated steel sheet for battery containers 100 is used for the battery container, corrosion resistance can be improved if deep cracks occur inside the battery container and thus the steel sheet 10 is exposed. That is, first, the ratio of Ni atoms contained in the iron-nickel alloy layer 20 becomes gradually lower toward the steel sheet 10 from the outermost surface, and the amount of nickel becomes lower at a side closer to the steel sheet 10 with respect to the iron-nickel alloy layer 20. Here, the nickel has a large standard electrode potential when being compared with the iron contained in the steel sheet 10, and the nickel is not easily eluted into the electrolyte of the battery. For this reason, the iron-nickel alloy layer 20 located in the vicinity of the steel sheet 10 has a small amount of nickel and thus is easily eluted into the electrolyte. As a result, it is possible to prevent a situation that the iron is preferentially eluted from the steel sheet 10 inside the battery and to suppress the elution of iron from the steel sheet 10. Accordingly, by the surface-treated steel sheet for battery containers 100 of this embodiment, it is possible to further improve corrosion resistance inside the battery, to suppress the generation of gas inside the battery with the elution of iron, and to prevent breakage or liquid leakage of the battery container due to such gas.

As described above, since the surface-treated steel sheet for battery containers 100 of this embodiment is configured such that the ratio of Ni atoms contained in the iron-nickel alloy layer 20 becomes gradually lower toward the steel sheet 10 from the outermost surface, it is excellent in discharge characteristics and corrosion resistance when being used for the battery container.

Thus, the surface-treated steel sheet for battery containers 100 of this embodiment can be suitably used for a battery container of a battery which is scheduled to be held or mounted over a long time, particularly, a holding battery for use in an emergency such as earthquake or a battery for use in a remote control of electric appliances, a flashlight, or the like.

That is, in the battery container of the battery which is scheduled to be held or mounted over a long time, holding characteristics based on the amount of gas to be generated inside the battery is particularly high. For example, in the case of LR6-type (AA-type) alkaline manganese battery, the amount of gas to be generated inside the battery is required to be less than 2 cc under conditions that a terminal voltage is reduced to 0.4 V of an end voltage for several days by discharging in a short time every day and then the battery is held at a temperature environment of 60° C. for 20 days. However, the surface-treated steel sheet for battery containers 100 of this embodiment can fully satisfy such characteristics.

Furthermore, the surface-treated steel sheet for battery containers 100 of this embodiment is excellent in discharge characteristics and corrosion resistance as described above. Thus, when the surface-treated steel sheet for battery containers 100 of this embodiment is used for the battery container of the battery, it can exhibit high output characteristics even after being held for a long time. For this reason, for example, when the surface-treated steel sheet for battery containers 100 of this embodiment is used for a battery which is used for emergency charging of, for example, smart phones and requires high output characteristics, for example an LR6-type (AA-type) alkaline manganese battery, it can fully satisfy characteristics that a short circuit current is 9 A or more under a condition of holding the battery at a temperature environment of 80° C. for 3 days.

An example of a method for measuring the content ratio of Ni atoms in the surface-treated steel sheet for battery containers 100 may include a method for measuring the transition of Ni intensity toward the steel sheet 10 from the iron-nickel alloy layer, which is the outermost surface, using the high-frequency glow discharge optical emission spectrometer.

<Battery Container>

A battery container of this embodiment can be obtained by forming of the surface-treated steel sheet for battery containers 100 described above. Specifically, the battery container can be obtained by forming of the above-described surface-treated steel sheet for battery containers 100 into a battery container shape through drawing, ironing, or DI or DTR forming. In this case, the surface-treated steel sheet for battery containers 100 is formed such that the iron-nickel alloy layer 20 becomes the inside of the battery container.

Since the battery container obtained in this way is obtained using the surface-treated steel sheet for battery containers 100 described above, battery characteristics such as liquid leakage resistance and discharge characteristics are improved. Thus, the service life of the battery increases and battery characteristics such as discharge characteristics are also excellent. Therefore, the battery container can be suitably used as a battery container of, for example, an alkaline battery, a battery such as a nickel-hydrogen battery using an alkaline electrolyte, or a lithium-ion battery.

Second Embodiment

Next, a second embodiment of the invention will be described.

Figure 4:
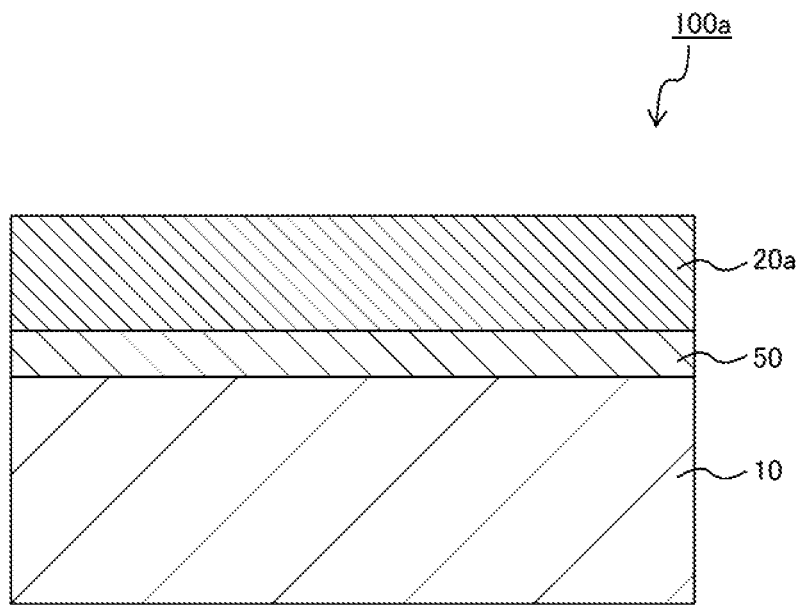
FIG. 4 is a configuration diagram of a surface-treated steel sheet for battery containers according to a second embodiment.

A surface-treated steel sheet for battery containers 100a according to a second embodiment has a configuration as illustrated in FIG. 4, and has the same configuration as the surface-treated steel sheet for battery containers 100 according to the first embodiment except that an iron-nickel diffusion layer 50 is provided between an iron-nickel alloy layer 20a and a steel sheet 10.

Figure 5:
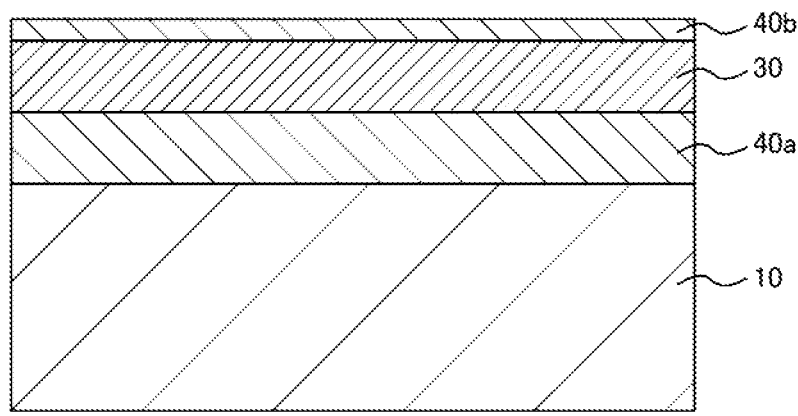
FIG. 5 is a diagram for describing a method for producing the surface-treated steel sheet for battery containers according to the second embodiment.

Unlike the surface-treated steel sheet for battery containers 100 according to the first embodiment described above, the surface-treated steel sheet for battery containers 100a according to the second embodiment is produced by the following method. That is, first, a nickel plating layer 40a and an iron-nickel alloy plating layer 30 are formed on a steel sheet 10 in this order, and then a nickel plating layer 40b is further formed on the iron-nickel alloy plating layer 30, whereby a surface-treated steel sheet is obtained as illustrated in FIG. 5. Subsequently, a thermal treatment is performed on the surface-treated steel sheet illustrated in FIG. 5 so that each layer is thermally diffused, and thus the iron-nickel alloy layer 20a and the iron-nickel diffusion layer 50 are formed. As a result, the surface-treated steel sheet for battery containers 100a is produced.

Here, the nickel plating layer 40a and the nickel plating layer 40b can be formed on the steel sheet 10 and the iron-nickel alloy plating layer 30 by a known method using a watt bath, a sulfamate bath, or the like, respectively. In addition, the iron-nickel alloy plating layer 30 can be formed by plating under the same conditions as the iron-nickel alloy plating in the first embodiment.

In this embodiment, the thermal treatment is performed on the surface-treated steel sheet illustrated in FIG. 5 so that each layer is thermally diffused, and thus the iron-nickel alloy layer 20a and the iron-nickel diffusion layer 50 are formed. In this case, the iron-nickel alloy layer 20a is formed by thermal diffusion between the iron-nickel alloy plating layer 30 and the nickel plating layer 40a and the nickel plating layer 40b, and the iron-nickel diffusion layer 50 is formed by thermal diffusion between the steel sheet 10 and the nickel plating layer 40a. Here, when the iron-nickel alloy layer 20a and the iron-nickel diffusion layer 50 are formed, the nickel plating layer 40 is completely diffused by the thermal treatment such that the nickel plating layer 40a does not remain alone in the resulting surface-treated steel sheet for battery containers 100a as illustrated in FIG. 4.

In this embodiment, the iron-nickel alloy layer 20a, which is formed by the thermal treatment in this way, has the same content ratio of Fe atoms at the outermost surface as that of the iron-nickel alloy layer 20 of the surface-treated steel sheet for battery containers 100 according to the first embodiment described above. A method for controlling the content ratio of Fe atoms at the outermost surface of the iron-nickel alloy layer 20a is not particularly limited, but may include, for example, a method for performing the iron-nickel alloy plating or a method for performing the thermal treatment under the same conditions as in the first embodiment described above.

Conditions of the thermal treatment may be similar to those of the thermal treatment in the first embodiment described above without being particularly limited. However, the conditions are set such that the nickel plating layer 40a does not remain alone by adjustment of the thermal treatment temperature and the thermal treatment time.

In this embodiment, the thickness of the nickel plating layer 40a is preferably 1.5 µm or less and more preferably 1.0 µm or less before the thermal treatment is performed. When the thickness of the nickel plating layer 40a exceeds 1.5 µm before the thermal treatment is performed, it may be required to perform the thermal treatment at a high temperature for a long time so as to completely diffuse the nickel plating layer, and thus the steel sheet may be deteriorated by heat in some cases. When the thickness of the nickel plating layer 40a is 1.5 µm or less before the thermal treatment is performed, it is possible to suppress deterioration of the steel sheet due to heat. Moreover, in the case of 1.0 µm or less, since the nickel plating layer 40a can be completely diffused by the thermal treatment under a lower thermal treatment temperature or a shorter thermal treatment time, it is possible to prevent deterioration of the steel sheet 10 due to heat.

In addition, the thickness of the nickel plating layer 40b before the thermal treatment is preferably 0.1 to 0.5 µm which is similar to that of the nickel plating layer 40 in the first embodiment. When the thickness of the nickel plating layer 40b is within the above range, it is possible to control the content ratio of Fe atoms to be the above range at the outermost surface of the resulting iron-nickel alloy layer 20 while preventing deterioration of the steel sheet due to excess heat at the time of the thermal treatment after forming the nickel plating layer 40b.

Moreover, in this embodiment, the iron-nickel alloy layer 20a formed by the thermal treatment has the same hardness as that of the iron-nickel alloy layer 20 of the surface-treated steel sheet for battery containers 100 according to the first embodiment described above.

The thickness of the iron-nickel alloy layer 20a formed by the thermal treatment is not particularly limited, but is preferably 0.6 to 3.0 µm. When the thickness of the iron-nickel alloy layer 20a is set to be within the above range, it is possible to further improve liquid leakage resistance and battery characteristics in a case where the resulting surface-treated steel sheet for battery containers 100a is used for the battery container.

In this embodiment, the thickness of the iron-nickel alloy layer 20a can be measured by, for example, the following method in the surface-treated steel sheet for battery containers 100a. That is, when the transition of Ni intensity may be measured using a high-frequency glow discharge optical emission spectrometer in a depth direction of the iron-nickel alloy layer 20a with respect to the surface-treated steel sheet for battery containers 100a, the thickness of the iron-nickel alloy layer 20a can thus be detected as a depth obtained up to a time at which a peak of Ni intensity appears from the start of measurement.

In the surface-treated steel sheet for battery containers 100a of this embodiment, with respect to Ni intensity to be measured by a high-frequency glow discharge optical emission spectrometer, there is a tendency that a peak appears by an increase from a certain depth of Ni intensity after a gradual decrease of Ni intensity in a depth direction from the outermost surface of the surface-treated steel sheet for battery containers 100a.

This is due to the fact the iron-nickel alloy layer 20a of the surface-treated steel sheet for battery containers 100a is formed by the thermal diffusion of the nickel plating layer 40a and the nickel plating layer 40b as illustrated in FIG. 5. That is, in the iron-nickel alloy layer 20a, there is a tendency that Ni intensity gradually decreases due to Ni derived from the nickel plating layer 40b in the depth direction from the outermost surface, and the peak appears by the increase of Ni intensity, which is decreasing, due to Ni derived from the nickel plating layer 40a.

In this embodiment, the transition of Ni intensity is measured in the depth direction of the iron-nickel alloy layer 20a with respect to the surface-treated steel sheet for battery containers 100a, using the high-frequency glow discharge optical emission spectrometer as described above, and the measurement time may be calculated from the starting time of measurement to a time at which the peak appears by the increase of Ni intensity after the decrease of Ni intensity. The thickness of the iron-nickel alloy layer 20a can be determined on the basis of the calculated measurement time.

In this embodiment, since the iron-nickel alloy layer 20a is formed by the thermal diffusion between the iron-nickel alloy plating layer 30 and the nickel plating layer 40a and the nickel plating layer 40b, the thickness of the iron-nickel alloy layer 20a is thicker than that of the iron-nickel alloy plating layer 30 in general.

Furthermore, the thickness of the iron-nickel diffusion layer 50 is not particularly limited in this embodiment. However, the thickness of the iron-nickel diffusion layer 50 can be also measured using the high-frequency glow discharge optical emission spectrometer in the same manner as in the measurement of the thickness of the iron-nickel alloy layer 20a. Specifically, the transition of Ni intensity can be measured using the high-frequency glow discharge optical emission spectrometer in a depth direction from the outermost surface with respect to the surface-treated steel sheet for battery containers 100a, and the thickness of the iron-nickel diffusion layer 50 can be detected as a depth obtained up to a time at which the Ni intensity becomes less than $\frac{1}{10}$ of the maximum value, from the time at which the peak appears by an increase of Ni intensity after a decrease of Ni intensity.

In this embodiment, the thermal diffusion is performed on the steel sheet 10 after the nickel plating layer 40a, the iron-nickel alloy plating layer 30, and the nickel plating layer 40b are formed on the steel sheet 10 in this order, and the outermost surface of the iron-nickel alloy layer 20a to be formed has the same content ratio of Fe atoms as in the first embodiment described above. Thus, liquid leakage resistance and battery characteristics can be improved in a case where the resulting surface-treated steel sheet for battery containers 100a is used for the battery container.

Figure 6:
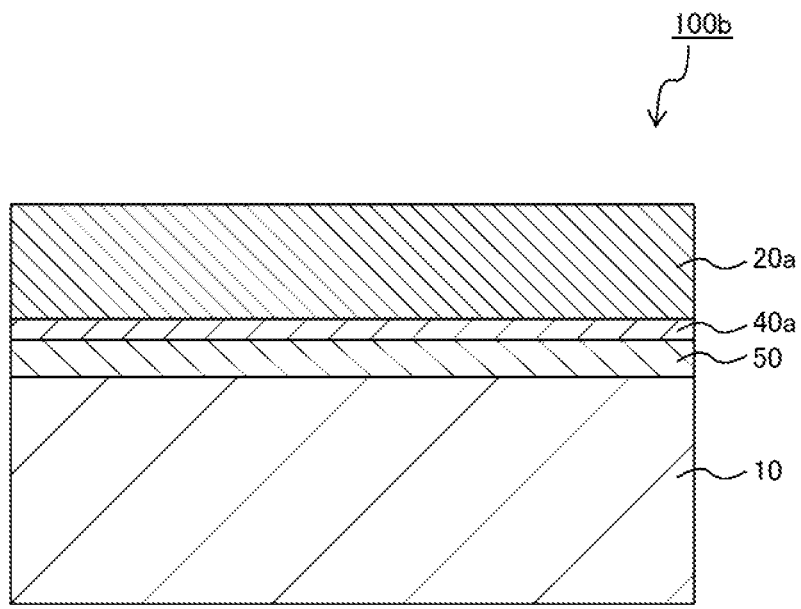
FIG. 6 is a configuration diagram illustrating another example of the surface-treated steel sheet for battery containers according to the second embodiment.

In this embodiment, similarly to a surface-treated steel sheet for battery containers 100b illustrated in FIG. 6, the nickel plating layer 40a may be configured to remain alone between the iron-nickel alloy layer 20a and the iron-nickel diffusion layer 50 by appropriate adjustment of the thickness of the nickel plating layer 40a before the thermal treatment or conditions of the thermal treatment.

In such a surface-treated steel sheet for battery containers 100b, the thickness of the iron-nickel alloy layer 20a can be measured using the following method, for example. That is, the transition of Fe intensity may be measured using a high-frequency glow discharge optical emission spectrometer in a depth direction of the iron-nickel alloy layer 20a with respect to the surface-treated steel sheet for battery containers 100b to detect a depth at which no iron exists, from the start of measurement, and the thickness of the iron-nickel alloy layer 20a can thus be determined.

In this embodiment, when the Fe intensity is measured for the surface-treated steel sheet for battery containers 100b, an iron existing region is defined as a region in which the Fe intensity is $1/10$ or more of the maximum value of the Fe intensity. Accordingly, in this embodiment, while the Fe intensity is measured in the depth direction of the surface-treated steel sheet for battery containers 100b, the measurement time may be first calculated from the starting time of measurement to a time at which the Fe intensity becomes less than $1/10$ of the maximum value. The thickness of the iron-nickel alloy layer 20a can be determined on the basis of the calculated measurement time. The maximum value of the Fe intensity represents Fe intensity when no variation of Fe intensity and Ni intensity occur while the measurement is performed using the high-frequency glow discharge optical emission spectrometer up to the steel sheet 10 in the depth direction of the surface-treated steel sheet for battery containers 100b.

In addition, the thickness of the nickel plating layer 40a can be also measured with respect to the surface-treated steel sheet for battery containers 100b using the high-frequency glow discharge optical emission spectrometer. That is, the transition of the Fe intensity is measured in the depth direction of the surface-treated steel sheet for battery containers 100b using the high-frequency glow discharge optical emission spectrometer, and thus the thickness of the nickel plating layer 40a can be detected as a region in which the Fe intensity becomes less than $1/10$ of the maximum value.

However, during the forming of the surface-treated steel sheet for battery containers 100b, in which the nickel plating layer 40a remains, into a battery container, cracks occurs inside the battery container and the cracks reach the steel sheet 10, whereby if the steel sheet 10, the nickel plating layer 40a, and the iron-nickel diffusion layer 50 are in a state of being exposed, there is a concern that the steel sheet 10 is easily eluted into the electrolyte. That is, in a case where the nickel plating layer 40a remains, due to the difference in standard electrode potential of iron in the steel sheet 10 and nickel in the nickel plating layer 40a, a battery is formed by the steel sheet 10 and the nickel plating layer 40a in an electrolyte, and the iron is eluted from the steel sheet 10. Consequently, the iron is diffused into the electrolyte, and thus it is concern that the elution of the steel sheet 10 proceeds in sequence.

In contrast, the surface-treated steel sheet for battery containers 100a illustrated in FIG. 3 has a configuration in which the nickel plating layer 40a does not remain, and thus it is possible to more effectively prevent the elution of the steel sheet 10 as compared with the above-described configuration illustrated in FIG. 6. Therefore, it is preferred that this embodiment has the configuration in which the nickel plating layer 40a does not remain as illustrated in FIG. 3.

Here, an example of a method of confirming whether the nickel plating layer 40a remains in the surface-treated steel sheet for battery containers 100a may include a method of measuring Fe intensity using a high-frequency glow discharge optical emission spectrometer. That is, it is determined that the nickel plating layer 40a remains in a case where a region exists in which the Fe intensity is less than $1/10$ of the maximum value of the Fe intensity when the transition of Fe intensity is measured using the high-frequency glow discharge optical emission spectrometer in a thickness direction toward the steel sheet 10 from the iron-nickel alloy layer 20a at the outermost surface, and it can be determined that the nickel plating layer 40a does not remain in a case where a region does not exist in which the Fe intensity is less than $1/10$ of the maximum value.

Embodiments of the invention have heretofore been described. These embodiments are described to facilitate understanding of the invention and are not described to limit the invention. It is therefore intended that the elements disclosed in the above embodiments include all design modifications and equivalents to fall within the technical scope of the invention.

EXAMPLE

The invention will be described below in detail with reference to Examples, but the invention is not limited to these Examples.

Evaluation methods of each of characteristics are as follows.

<Measurement the Content Ratio of Fe Atoms in the Outermost Layer after the Thermal Treatment>

The surface of the surface-treated steel sheet for battery containers was measured using a field emission Auger microprobe (model number: JAMP-9500F manufactured by JEOL Ltd.), whereby the content ratio (% by atom) of Fe atoms was obtained. With respect to Examples 1 and 2 and Comparative Examples 1 to 8 of Examples and Comparative Examples to be described below, the measurement of the content ratio of Fe atoms at the outermost surface after the thermal treatment was conducted.

<Measurement of Surface Hardness>

With respect to the surface-treated steel sheet for battery containers, Vickers hardness (HV) was measured by a micro hardness tester (model number: MVK-G2 manufactured by Akashi Co.) using a diamond indenter under conditions of a load: 10 gf and a holding time: 10 seconds, and thus the surface hardness was measured. With respect to Examples 1 and 2 and Comparative Examples 1 to 8, the measurement of surface hardness was conducted.

<Measurement of Fe Intensity and Ni Intensity>

The transition of Ni intensity and Fe intensity was measured using a high-frequency glow discharge optical emission spectrometer (Model number: GDS-3860 manufactured by Rigaku Corporation) in a thickness direction toward the steel sheet from the outermost surface with respect to the surface-treated steel sheet for battery containers. The measurement of Fe intensity and Ni intensity was conducted with respect to Example 2 and Comparative Examples 1, 6, and 8 of Examples and Comparative Examples to be described below.

<Evaluation of Battery Characteristics>

After an alkaline manganese battery produced using the surface-treated steel sheet for battery containers was held at an environment of a temperature of 80° C. for three days, and a current meter was connected to the battery, thereby providing a closed circuit. At this time, a current (short circuit current) flowing between both terminals was measured, and the battery characteristics were evaluated under the following criteria based on the obtained current value. The evaluation of battery characteristics was conducted with respect to Examples 1 and 2 and Comparative Examples 1 to 8 of Examples and Comparative Examples to be described below.

A: short circuit current was 9 A or more
B: short circuit current was 8 A or more but less than 9 A
C: short circuit current was 7 A or more but less than 8 A
D: short circuit current was less than 7 A In the evaluation of battery characteristics, superiority or inferiority of discharge characteristics can be evaluated when the surface-treated steel sheet for battery containers is used for the battery containers. At this time, it was acceptable that the short circuit current was 9 A or more (evaluation A), whereas it was unacceptable that the short circuit current was less than 9 A (evaluations B to D).

<Evaluation of the Amount of Gas to be Generated>

First, an external load having an electric resistance value of 3.9Ω was connected to the alkaline manganese battery produced using the surface-treated steel sheet for battery containers to repeatedly perform a discharge operation of one hour a day for several days, and thus a voltage of the alkaline manganese battery was reduced to 0.4 V. Thereafter, the alkaline manganese battery was held at a temperature environment of 60° C. for 20 days and was thus destroyed in water. At this time, the amount of generated gas in the water was measured. Measurement results were evaluated by the following criteria. The evaluation of the amount of gas to be generated was conducted with respect to Examples 1 and 2 and Comparative Examples 1 to 8 of Examples and Comparative Examples to be described below.

A: amount of generated gas was less than 2 cc
B: amount of generated gas was 2 cc or more but less than 2.5 cc
C: amount of generated gas was 2.5 cc or more but less than 3 cc
D: amount of generated gas was 3 cc or more In the evaluation of the amount of gas to be generated, superiority or inferiority of corrosion resistance (that is, lengths in service life of the battery based on corrosion resistance of the battery container) can be evaluated when the surface-treated steel sheet for battery containers is used for the battery containers, and it was assumed that the surface-treated steel sheet for battery containers is used for the battery container of the battery which was scheduled to be held or mounted over a long time. At this time, it was acceptable that the amount of generated gas was less than 2 cc (evaluation A), whereas it was unacceptable that the amount of generated gas was 2 cc or more (evaluations B to D).

Example 1

As a base substance, there was prepared a steel sheet obtained by annealing a cold-rolled sheet (thickness of 0.25 mm) of low-carbon aluminum-killed steel having a chemical composition as below:

C: 0.045 wt %, Mn: 0.23 wt %, Si: 0.02 wt %, P: 0.012 wt %, S: 0.009 wt %, Al: 0.063 wt %, and the balance: Fe and inevitable impurities Then, after the prepared steel sheet was subjected to alkaline electrolytic degreasing and acid cleaning through sulfuric acid immersion, electroplating was conducted under the following conditions, whereby an iron-nickel alloy plating layer with a thickness of 0.9 μm was formed on the steel sheet as a lower plating layer. The following bath composition has been adjusted such that the composition of the iron-nickel alloy plating layer to be formed has the content ratio of Fe atoms being 30% by atom and the content ratio of Ni atoms being 70%.

Bath composition: nickel sulfate of 220 g/L, nickel chloride of 45 g/L, iron sulfate of 30 g/L, and boric acid of 30 g/L
pH: 3.0
Bath temperature: 60° C.
Current density: 10 A/dm$^2$ Next, electroplating was performed on the formed iron-nickel alloy plating layer under the following conditions, and thus a nickel plating layer having a thickness of 0.1 μm was formed as an upper plating layer.

Bath composition: nickel sulfate of 250 g/L, nickel chloride of 45 g/L, and boric acid of 30 g/L
pH: 4.2
Bath temperature: 60° C.
Current density: 10 A/dm$^2$ Then, for the steel sheet formed with the iron-nickel alloy plating layer and the nickel plating layer, continuous annealing was carried out to perform a thermal treatment under the conditions of a temperature of 700° C. for one minute and a reducing atmosphere, whereby the iron-nickel alloy plating layer was thermally diffused and the iron-nickel alloy layer was formed. Consequently, the surface-treated steel sheet for battery containers having the configuration illustrated in FIG. 1 was obtained.

Thereafter, for the surface-treated steel sheet for battery containers obtained in such a manner, measurement of the content ratio of Fe atoms at the outermost surface after the thermal treatment and measurement of the surface hardness were performed in accordance with the above-described methods. Results are listed in Table 1.

Moreover, the surface-treated steel sheet for battery containers obtained in the above manner was punched to a blank diameter of 57 mm, and was formed into an LR6-type battery (AA-type battery) container having a cylindrical shape of an outer diameter of 13.8 mm and a height of 49.3 mm through a multistage drawing process and further re-drawing forming such that the iron-nickel alloy layer would be located at the inner surface side of the battery container, and the battery container was thus produced.

Subsequently, the obtained battery container was used to prepare an alkaline manganese battery as below. That is, a positive electrode mixture was prepared by sampling manganese dioxide and graphite with a ratio of 10:1, adding potassium hydroxide (10 mol/L) to the manganese dioxide and graphite, and mixing them. Next, this positive electrode mixture was pressurized in a mold to form a doughnut-shaped positive electrode mixture pellet having a predetermined size, and the mixture pellet was pressed and inserted into the battery container obtained as described above. Next, a separator formed of vinylon fabric cloth was inserted into the positive electrode mixture pellet, which was pressed and inserted in the battery container, so as to be located along the inner periphery of the positive electrode mixture pellet, and the battery container was filled with a negative electrode gel comprising zinc particles and potassium hydroxide saturated with zinc oxide. After attaching an insulator gasket to the negative electrode plate to which the negative electrode current collector rod is spot welded and inserting them into the battery container, caulking was performed to complete the alkaline manganese battery.

Then, with respect to the alkaline manganese battery obtained in this manner, evaluation of battery characteristics and evaluation of the amount of gas to be generated were performed. Results are listed in Table 1.

Example 2

A surface-treated steel sheet for battery containers was prepared in the same manner as in Example 1 except that plating conditions were changed such that an iron-nickel alloy plating layer (lower plating layer) formed by electroplating had compositions indicated in Table 1. Measurement was conducted with respect to the content ratio of Fe atoms at the outermost surface after a thermal treatment, surface hardness, and Fe intensity and Ni intensity. Thereafter, an alkaline manganese battery was prepared in the same manner as in Example 1, and evaluations were conducted in the same manner as in Example 1. Results are listed in Table 1 and are illustrated in FIG. 7(A).

Figure 7A:
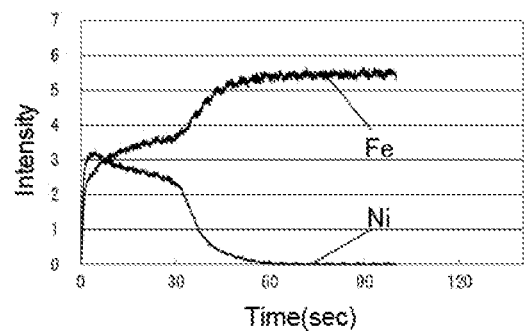
FIGS. 7A-7D are a diagram illustrating results obtained by measuring Ni intensity and Fe intensity with respect to surface-treated steel sheets for battery containers obtained in Examples and Comparative Examples, using a high-frequency glow discharge optical emission spectrometer.

FIG. 7(A) is a graph illustrating a measurement result of Fe intensity and Ni intensity and illustrates a result obtained in such a manner that measurement with respect to the surface of the surface-treated steel sheet for battery containers started at 0 second using a high-frequency glow discharge optical emission spectrometer and the measurement was performed in a thickness direction toward the steel sheet from the iron-nickel alloy layer with the lapse of time.

Comparative Example 1

Figure 7B:
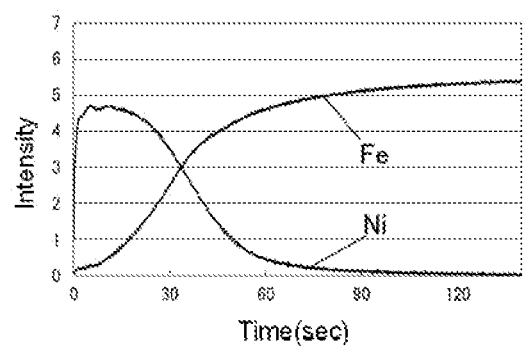

A surface-treated steel sheet for battery containers and an alkaline manganese battery were prepared in the same manner as in Example 2 except that a nickel plating layer (upper plating layer) having a thickness of 1.0 μm was formed by electroplating under appropriately adjusted plating conditions without formation of a lower plating layer, and evaluations were conducted in the same manner as in Example 2. Results are listed in Table 1 and are illustrated in FIG. 7(B).

Comparative Examples 2 and 3

A surface-treated steel sheet for battery containers and an alkaline manganese battery were prepared in the same manner as in Example 1 except that plating conditions were changed such that an iron-nickel alloy plating layer (lower plating layer) formed by electroplating had compositions indicated in Table 1, and evaluations were conducted in the same manner as in Example 1. Results are listed in Table 1.

Comparative Examples 4 to 6

Figure 7C:
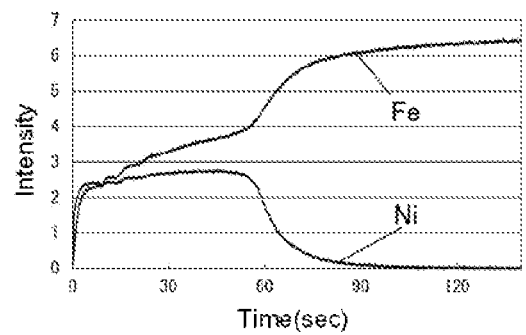

A surface-treated steel sheet for battery containers and an alkaline manganese battery were prepared in the same manner as in Example 2 except that an iron-nickel alloy plating layer was formed as an upper plating layer by electroplating under appropriately adjusted plating conditions without formation of a lower plating layer, such that the composition and thickness of an iron-nickel alloy plating layer were set as indicated in Table 1, and evaluations were conducted in the same manner as in Example 2. Results are listed in Table 1 and are illustrated in FIG. 7(C).

Comparative Examples 7 and 8

Figure 7D:
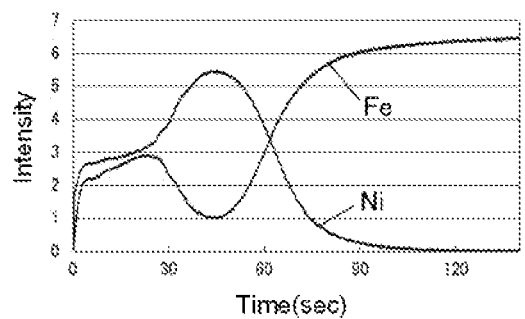

A surface-treated steel sheet for battery containers and an alkaline manganese battery were prepared in the same manner as in Example 2 except that a nickel plating layer (lower plating layer) and an iron-nickel alloy plating layer (upper plating layer) were formed on a steel sheet by electroplating under appropriately adjusted plating conditions such that the composition and thickness were set as indicated in Table 1, and evaluations were conducted in the same manner as in Example 2. Results are listed in Table 1 and are illustrated in FIG. 7(D).

TABLE 1

| | Configuration of plating layer before thermal treatment | | | | | | Content ratio of Fe atoms at outermost surface after thermal treatment [at %] | Surface hardness [HV] | Battery characteristics* | Amount of gas to be generated** |
|---|---|---|---|---|---|---|---|---|---|---|
| | Upper plating layer | | | Lower plating layer | | | | | | |
| | Fe [at %] | Ni [at %] | Thickness [mm] | Fe [at %] | Ni [at %] | Thickness [mm] | | | | |
| Example 1 | 0 | 100 | 0.1 | 30 | 70 | 0.9 | 27 | 222 | A | A |
| Example 2 | 0 | 100 | 0.1 | 50 | 50 | 0.9 | 48 | 248 | A | A |
| Comparative Example 1 | 0 | 100 | 1.0 | | None | | 0 | 195 | C | B |
| Comparative Example 2 | 0 | 100 | 0.1 | 10 | 90 | 0.9 | 7 | 215 | B | A |
| Comparative Example 3 | 0 | 100 | 0.1 | 70 | 30 | 0.9 | 60 | 266 | B | C |
| Comparative Example 4 | 40 | 60 | 2.0 | | None | | 44 | 245 | A | B |
| Comparative Example 5 | 45 | 55 | 2.0 | | None | | 45 | 250 | A | B |
| Comparative Example 6 | 50 | 50 | 2.0 | | None | | 54 | 264 | A | C |
| Comparative Example 7 | 50 | 50 | 0.5 | 0 | 100 | 1.5 | 46 | 235 | A | B |
| Comparative Example 8 | 50 | 50 | 1.0 | 0 | 100 | 1.0 | Not conducted | Not conducted | Not conducted | Not conducted |

*A being defined to be acceptable.
**A being defined to be acceptable.

As indicated in Table 1, with respect to Examples 1 and 2 where after the iron-nickel alloy plating layer and the nickel plating layer were formed as the lower plating layer and the upper plating layer, respectively, the iron-nickel alloy layer was formed by the thermal treatment such that the content ratio of Fe atoms was 12 to 55% by atom at the outermost surface, evaluation results were excellent in both of the battery characteristics and the amount of gas to be generated. Thus, it was confirmed that the surface-treated steel sheet for battery containers obtained in each of Examples 1 and 2 could be suitably used for the battery container of the battery which was scheduled to be held or mounted over a long time and was excellent in battery characteristics such as discharge characteristics while having a further extended service life of the battery. Particularly, in the surface-treated steel sheet for battery containers obtained in Example 2, the evaluation result was good in terms of the amount of gas to be generated even when the content ratio of Fe atoms was as high as 48% at the outermost surface. Thus, as described above, when the content ratio of Fe atoms became larger in the iron-nickel alloy layer, the service life of the battery was extended while the battery characteristics such as discharge characteristics were improved, as a result.

Furthermore, it was confirmed from the result illustrated in FIG. 7(A) that the surface-treated steel sheet for battery containers obtained in Example 2 was configured such that Ni intensity gradually decreased toward the steel sheet serving as a base substance from the outermost surface (near 0 second) and Fe intensity gradually increased. In particularly, as illustrated in FIG. 7(A), the surface-treated steel sheet for battery containers obtained in Example 2 was confirmed that Ni intensity obviously decreased in the vicinity of the outermost surface (near 0 to 15 seconds) and Fe intensity increased. Therefore, with respect to the surface-treated steel sheet for battery containers obtained in Example 2, since the content ratio of Ni atoms was particularly high at the outermost surface, corrosion resistance was excellent, and since the content ratio of Fe atoms was high inside the iron-nickel alloy layer, the overall iron-nickel alloy layer could have an appropriate degree of surface hardness as described above. Accordingly, it was confirmed that cracks of fine and shallow depth could occur on the surface when the surface-treated steel sheet for battery containers was formed into the battery container, and thus battery characteristics such as discharge characteristics could be improved.

Meanwhile, as indicated in Table 1, with respect to Comparative Examples 1 and 4 to 7 where the plating layer before the thermal treatment was not configured by the iron-nickel alloy plating layer (lower plating layer) and the nickel plating layer (upper plating layer), at least one of evaluation results of battery characteristics and the amount of gas to be generated was poor. For this reason, as a result, there was a tendency that the battery characteristics such as discharge characteristics were inferior or the service life of the battery was shortened. Even in Comparative Examples 2 and 3 where the content ratio of Fe atoms was less than 12% by atom or exceeded 55% by atom at the outermost surface of the iron-nickel alloy layer, similarly, at least one of evaluation results of battery characteristics and the amount of gas to be generated was poor. As a result, there was a tendency that the battery characteristics such as discharge characteristics were inferior or the service life of the battery was shortened With respect to Comparative Examples 4, 5, and 7 of these Comparative Examples, as indicated in Table 1, it was confirmed that the evaluation result of the amount of gas to be generated was "B" and the service life of the battery was relatively long, but it was unacceptable based on the above-described evaluation criteria. Therefore, when the surface-treated steel sheet for battery containers obtained in Comparative Example 4, 5, or 7 was used for a battery container of a battery which is scheduled to be held or mounted over a long time, particularly, a holding battery for use in an emergency such as earthquake or a battery for use in a remote control of electric appliances, a flashlight, or the like, as a result, the service life of the battery did not surely reach to the sufficient extent.

Furthermore, with respect to the surface-treated steel sheet for battery containers obtained in Comparative Example 1, it was confirmed from the result illustrated in FIG. 7(B) that Fe intensity became almost zero at the outermost surface (near 0 second) and thus Fe atoms were not thermally diffused to the outermost surface. Furthermore, it was confirmed from the results illustrated in FIGS. 7(C) and 7(D) that the configuration of the surface-treated steel sheet for battery containers obtained in Comparative Example 6 or 8 was different from the above-described configuration illustrated in FIG. 7(A) (that is, the configuration in which Ni intensity decreased toward the steel sheet serving as a base substance from the outermost surface and Fe intensity increased). In particularly, it was confirmed from FIGS. 7(C) and 7(D) that the configuration of the surface-treated steel sheet for battery containers obtained in Comparative Example 6 or 8 was apparently different from the above-described configuration illustrated in FIG. 7(A) (the configuration in which Ni intensity decreased and Fe intensity increased) in the vicinity of the outermost surface (near 0 to 15 seconds).

DESCRIPTION OF REFERENCE NUMERALS 100, 100a, 100b: surface-treated steel sheet for battery containers
10: steel sheet
20, 20a: iron-nickel alloy layer
30: iron-nickel alloy plating layer
40, 40a, 40b: nickel plating layer
50: iron-nickel diffusion layer

The invention claimed is:

1. A method for producing a surface-treated steel sheet for battery containers, comprising:
    a first process of forming an iron-nickel alloy plating layer on at least one side of a steel sheet;
    a second process of forming a nickel plating layer on the iron-nickel alloy plating layer; and
    a third process of performing a thermal treatment after forming the nickel plating layer so as to form an iron-nickel alloy layer having an outermost surface, at which a content ratio of Fe atoms is 12 to 55 atomic %, on an outermost layer by thermal diffusion.

2. The method for producing the surface-treated steel sheet according to claim 1, wherein the iron-nickel alloy plating layer is formed in the first process to have a content ratio of Fe atoms being 15 to 65 atomic %.

3. The method for producing the surface-treated steel sheet according to claim 1, wherein the nickel plating layer is formed in the second process to have a thickness of 0.1 to 0.5 μm.

* * * * *